United States Patent
Kobayashi et al.

(10) Patent No.: US 11,142,678 B2
(45) Date of Patent: Oct. 12, 2021

(54) DOWNHOLE TOOL

(71) Applicant: Kureha Corporation, Tokyo (JP)

(72) Inventors: Fuminori Kobayashi, Tokyo (JP); Hikaru Saijo, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 17/258,616

(22) PCT Filed: Jun. 6, 2019

(86) PCT No.: PCT/JP2019/022564
§ 371 (c)(1),
(2) Date: Jan. 7, 2021

(87) PCT Pub. No.: WO2020/012839
PCT Pub. Date: Jan. 16, 2020

(65) Prior Publication Data
US 2021/0246355 A1    Aug. 12, 2021

(30) Foreign Application Priority Data
Jul. 12, 2018 (JP) .............. JP2018-132602

(51) Int. Cl.
*C09K 8/42* (2006.01)
*C08K 5/1539* (2006.01)
*C08L 77/10* (2006.01)
*C08L 79/08* (2006.01)
*E21B 33/134* (2006.01)

(52) U.S. Cl.
CPC ............ *C09K 8/426* (2013.01); *C08K 5/1539* (2013.01); *C08L 77/10* (2013.01); *C08L 79/08* (2013.01); *E21B 33/134* (2013.01)

(58) Field of Classification Search
CPC ........ C08K 5/1539; C08K 5/09; C08K 5/092; C08K 5/095; C08K 5/098; C08K 2201/018; C08L 77/00; C08L 77/02; C08L 77/04; C08L 77/06; C08L 77/08; C08L 77/10; C08L 77/12; C08L 79/00; C08L 79/02; C08L 79/04; C08L 79/06; C08L 79/08; C08L 79/085
See application file for complete search history.

(56) References Cited

U.S. PATENT DOCUMENTS

| | | | |
|---|---|---|---|
| 9,611,715 B1 | 4/2017 | Smith | |
| 2015/0051119 A1 | 2/2015 | Masaki et al. | |
| 2016/0289374 A1 | 10/2016 | Saito et al. | |
| 2016/0298017 A1* | 10/2016 | Takahashi | C09K 8/44 |
| 2016/0298415 A1 | 10/2016 | Takahashi et al. | |
| 2017/0016298 A1 | 1/2017 | Takahashi et al. | |
| 2017/0175481 A1 | 6/2017 | Kobayashi et al. | |
| 2017/0247598 A1 | 8/2017 | Kennedy et al. | |
| 2018/0038191 A1 | 2/2018 | Davies et al. | |
| 2018/0142096 A1 | 5/2018 | Li et al. | |
| 2018/0171748 A1 | 6/2018 | Hou et al. | |
| 2018/0179850 A1 | 6/2018 | Hou et al. | |
| 2018/0179851 A1 | 6/2018 | Davies et al. | |
| 2018/0179852 A1 | 6/2018 | Hou et al. | |
| 2018/0187500 A1 | 7/2018 | Avila et al. | |
| 2019/0002667 A1* | 1/2019 | Kobayashi | E21B 33/1208 |

FOREIGN PATENT DOCUMENTS

| | | | | |
|---|---|---|---|---|
| CA | 2939066 A1 | 9/2015 | | |
| CA | 3008587 A1 * | 6/2017 | ............... | C08K 5/42 |
| CA | 2984261 A1 | 1/2018 | | |
| CA | 3004370 A1 | 1/2018 | | |
| CA | 3000323 A1 | 5/2018 | | |
| CA | 3001787 A1 | 5/2018 | | |
| CN | 104105758 A | 10/2014 | | |
| CN | 105637174 A | 6/2016 | | |
| CN | 105934481 A | 9/2016 | | |
| CN | 106030023 A | 10/2016 | | |
| CN | 106661440 A | 5/2017 | | |
| CN | 108138551 A | 6/2018 | | |
| CN | 108337898 A | 7/2018 | | |
| CN | 108350727 A | 7/2018 | | |
| CN | 108431365 A | 8/2018 | | |
| JP | 2015-124266 A | 7/2015 | | |
| JP | 2015-172106 A | 10/2015 | | |
| JP | 2016-190901 A | 11/2016 | | |
| JP | 2017-150026 A | 8/2017 | | |
| JP | 2017-200985 A | 11/2017 | | |
| WO | WO-2015072317 A1 * | 5/2015 | ............. | C09K 8/035 |
| WO | WO-2017110609 A1 * | 6/2017 | ........... | C08K 5/0033 |
| WO | WO-2017110610 A1 * | 6/2017 | ............. | C08G 18/42 |
| WO | 2018/009485 A1 | 1/2018 | | |
| WO | 2018/009487 A1 | 1/2018 | | |
| WO | 2018/094184 A1 | 5/2018 | | |
| WO | 2018/094257 A1 | 5/2018 | | |

OTHER PUBLICATIONS

Chinese Office Action dated Apr. 27, 2021.
Chinese Office Action for Application No. 201980039620.7 dated Jul. 28, 2021.

* cited by examiner

*Primary Examiner* — Christopher M Rodd
(74) *Attorney, Agent, or Firm* — Colson Law Group, PLLC

(57) ABSTRACT

A downhole tool that has a high initial compressive strength, can maintain compressive strength for a certain period of time, and is rapidly degradable after use. The downhole tool is formed from a degradable resin composition containing a polyamide resin and a carboxylic acid anhydride, and the carboxylic acid anhydride is a compound satisfying the following melting point condition:

melting point of polyamide resin≤5% weight reduction temperature of carboxylic acid anhydride.

7 Claims, 1 Drawing Sheet

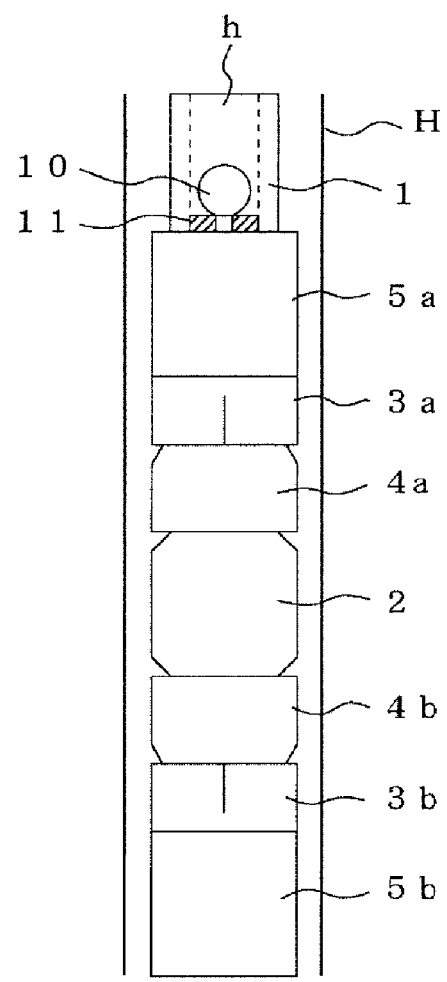

DOWNHOLE TOOL

TECHNICAL FIELD

The present invention relates to a downhole tool.

BACKGROUND ART

Hydrocarbon resources such as petroleum (including shale oil) or natural gas (including shale gas) have been produced by excavation through wells (oil wells or gas wells, sometimes referred to collectively as "wells") having a porous and permeable subterranean formation. As energy consumption increases, deeper wells are being drilled, reaching depths greater than 9000 m worldwide and greater than 6000 m in Japan. In wells that are continuously excavated, the productive layer is stimulated in order to continuously excavate hydrocarbon resources efficiently from subterranean formations of which permeability has decreased over time and further subterranean formations of which permeability has gradually become insufficient. Known stimulation methods include acid treatment and fracturing. Acid treatment is a method in which the permeability of the productive layer is increased by injecting acids such as hydrochloric acid and hydrofluoric acid into the productive layer and dissolving the reaction components of bedrock (such as carbonates, clay minerals, and silicates). However, various problems that accompany the use of strong acids have been identified, and increased costs, including various countermeasures, have also been pointed out. Thus, perforation for forming pores and hydraulic fracturing for forming fractures (also referred to as "fracturing") in the productive layer using fluid pressure have received attention.

Hydraulic fracturing is a method, in which perforations and fractures are generated in the productive layer by fluid pressure such as water pressure (hereinafter sometimes referred to simply as "hydraulic pressure"). Generally, a vertical hole is drilled, and then the vertical hole is subsequently provided with a bend and a horizontal hole is drilled in a subterranean formation several thousand meters underground. Fluid such as fracturing fluid is then fed into these boreholes (meaning holes provided for forming a well, also referred to as "downholes") at high pressure, and fractures and the like are produced by the hydraulic pressure in the subterranean productive layer (layer that produces the hydrocarbon resource such as petroleum or natural gas), and the productive layer is thereby stimulated so that the hydrocarbon resource are extracted and recovered through the fractures and the like. The efficacy of hydraulic fracturing has also been examined for the development of unconventional resources such as shale oil (oil that matures in shale) and shale gas.

Fractures and the like formed by fluid pressure such as water pressure immediately close due to pressure in the formation when the hydraulic pressure is no longer applied. To prevent a fracture closure, a proppant is included in the fracturing fluid (i.e., the well treatment fluid used in fracturing), which is fed into the borehole at high pressure, thereby distributing the proppant in the fracture. Inorganic or organic materials are used as proppants included in fracturing fluid, but silica, alumina, and other inorganic particles have been conventionally used, and sand particles such as 20/40-mesh have been widely used because they are capable of preventing fracture closure in a very deep subterranean environment under high-temperature and high-pressure for a long time.

Various types of water-based, oil-based, and emulsion-based fluids are used as injection well treatment fluids which are fed in at high pressure, such as fracturing fluid. Because the well treatment fluid must have the function of transporting the proppant to the location where the fracture is generated in the borehole, it generally must have a prescribed viscosity, good proppant dispersibility, ease of post-treatment, and low environmental load. Furthermore, fracturing fluid sometimes contains a channelant in order to form flow paths through which shale oil, shale gas, and the like can pass among the proppant. Accordingly, in addition to the proppant, various additives are used in the well treatment fluid, including channelants, gelling agents and antiscale agents, as well as acids for dissolving rock and friction reducers.

The following method is typically used to produce fractures and perforations by hydraulic pressure in the productive layer of a deep subterranean formation (layer that produces the hydrocarbon resource including petroleum such as shale oil or natural gas such as shale gas) using fluid fed in at high pressure. Specifically, a predetermined section of a borehole (downhole) drilled and completed in a subterranean formation several thousand meters deep is partially plugged while isolating sequentially from the tip portion of the borehole, and fluid is fed in at high pressure into the plugged section to produce fractures and perforations in the productive layer. Then, the next predetermined section (typically in front of the preceding section, i.e., a section closer to the ground surface) is plugged to produce fractures and perforations. After that, this process is repeated until the required isolation and formation of fractures and perforations have been completed.

Stimulation of the productive layer is sometimes repeated for desired sections of boreholes that have already been formed, and is not limited to drilling of new wells. In this case as well, the operations of borehole plugging, fracturing, and the like are similarly repeated. Additionally, there are also cases where, to perform completion of the well, the borehole is plugged to block fluid from below, and after the completion of the top portions thereof is performed, the plugging is released. On the interior of these newly formed boreholes and previously formed boreholes, various tools are used to perform required operations, and these tools have the generic name "downhole tools."

Patent Document 1 discloses an invention relating to a Ni-based alloy having high strength and high corrosion resistance in a high-temperature corrosive environment. Patent Document 1 discloses that the Ni-based alloy has high strength (tensile test, 0.2% proof stress) of 1200 MPa or greater, and that the Ni-based alloy constitutes a member for oil drilling.

In this regard, Patent Document 2 discloses a downhole tool formed from a polyglycolic acid resin, which can be used under harsh and diverse well environmental conditions and can be easily removed according to need.

For example, Patent Document 3 discloses a downhole tool in which polyamide buttons are arranged around an end ring.

CITATION LIST

Patent Document

Patent Document 1: JP 2017-150026 A
Patent Document 2: JP 2015-124266 A
Patent Document 3: U.S. Pat. No. 9,611,715

SUMMARY OF INVENTION

Technical Problem

However, well drilling environments have become harsh and diverse, and, especially, downhole tools for use in well drilling are arranged sequentially inside the borehole until the well is completed, but must be removed at the stage where production of petroleum such as shale oil, natural gas such as shale gas (hereinafter sometimes referred to collectively as "petroleum and natural gas"), or the like is begun. In this regard, there are plugs specially designed to be retrievable after use (retrievable plugs), but since plugs are placed in deep subterranean, substantial cost and time are required to recover all of them.

Because the downhole tool described in Patent Document 1 is not designed to be retrievable upon release of plugging after use, it is removed by destruction or fragmentation by milling, drill out, or another method, but substantial cost and time are required for milling, drill out, and the like.

In this regard, Patent Document 2 discloses a downhole tool using polyglycolic acid as a degradable material. However, a downhole tool that is degradable after use while maintaining strength in harsher high-temperature environments, as compared with the downhole tool described in Patent Document 2, is demanded because deeper wells are being drilled or well drilling can be performed even in regions where the geothermal heat is originally high.

Patent Document 3 describes the use of a polyamide resin in the buttons, but does not disclose the degradability of the polyamide resin.

The present invention has been made in light of the above problems, and an object of the present invention is to provide a novel downhole tool that has a high initial compressive strength, can maintain compressive strength for a certain period of time, and is rapidly degradable after use.

Solution to Problem

To solve the above problems, a downhole tool according to an aspect of the present invention is formed from a degradable resin composition containing a polyamide resin and a carboxylic acid anhydride, and the carboxylic acid anhydride is a compound satisfying the following condition:

melting point of polyamide resin≤5% weight reduction temperature of carboxylic acid anhydride.

Advantageous Effects of Invention

The downhole tool according to an aspect of the present invention has a high initial compressive strength, can maintain compressive strength for a certain period of time, and is rapidly degradable after use. Thus, the present invention can provide a novel downhole tool that retains a high compressive strength even in high-temperature and high-pressure environments during use, and is rapidly degraded after use.

BRIEF DESCRIPTION OF THE DRAWINGS

FIG. 1 is a view schematically illustrating a downhole tool according to an aspect of the present invention.

DESCRIPTION OF EMBODIMENTS

<Downhole Tool>

In a broad sense, the term "downhole tool" is used as a concept that includes a drilling device and a power source thereof for performing further drilling of a well, as well as sensors and communications devices for acquiring and exchanging information about the tool position and drilling situation. The term may also be used as a concept that includes plugs and downhole tool members as plug-constituting members which will be described below. In the present specification, the term "downhole tool" means an instrument that is used in a well in operations for drilling the well and must be removed by some method at the stage where production of petroleum, gas, and the like is begun, and a member constituting the instrument.

Exemplary downhole tools can include: both i) a downhole tool made from a degradable resin composition or a member thereof, for example, a ball sealer made from a degradable resin composition and a ball seat made from the degradable resin composition; and ii) a downhole tool provided with a member made from a degradable resin composition or a member thereof, for example, a plug provided with a mandrel made from a degradable resin composition (such as a frac plug or a bridge plug) and a plug provided with a ring made from a degradable resin composition. Note that the term "downhole tool" may also include the meaning of a "downhole tool member constituting the downhole tool", unless otherwise indicated herein.

After being used in a well, the downhole tool is removed as described above. As a means for realizing the removal thereof, there is a means of molding the downhole tool using, for example, a degradable resin having hydrolyzability. The "degradability" of the degradable resin may be degradability with biodegradability, meaning that the degradable resin is degraded by microorganisms in the soil in which fracturing fluid or the like is used, or with hydrolyzability, meaning that the degradable resin is degraded by a solvent such as fracturing fluid, particularly by water, and further by an acid or alkali if desired. Additionally, it may be degradability, meaning that the degradable resin can be degraded chemically by some other method, for example, under a heating condition at a predetermined temperature or higher.

The downhole tool according to an aspect of the present invention is a downhole tool formed from a degradable resin composition containing a polyamide resin and a carboxylic acid anhydride, and a melting point of the polyamide resin and a 5% weight reduction temperature of the carboxylic acid anhydride satisfy the condition of Formula (1) below. As a result, it is possible to provide a downhole tool that maintains a high compressive strength for a predetermined period of time in a high-temperature environment, and can be rapidly degraded and removed after a lapse of the predetermined period of time, and a downhole tool member constituting the downhole tool.

[Degraded Resin Composition]

The degradable resin composition forming the downhole tool according to an aspect of the present invention contains a polyamide resin and a carboxylic acid anhydride, and a melting point of the polyamide resin and the 5% weight reduction temperature of the carboxylic acid anhydride satisfy the condition of Formula (1) below.

Melting point of polyamide resin≤5% weight reduction temperature of carboxylic acid anhydride (1)

The polyamide resin and carboxylic acid anhydride contained in the degradable resin composition are selected so as to satisfy the condition of Formula (1), thereby making it possible to prevent volatilization of the carboxylic acid anhydride and generation of bubbles when melt-kneading the degradable resin composition and molding the downhole tool. Therefore, the downhole tool is suppressed in generation of bubbles therein, and has an initial compressive strength higher than those of downhole tools having bubbles generated therein.

More preferably, in the degradable resin composition, the melting point of the polyamide resin and the 5% weight reduction temperature of the carboxylic acid anhydride satisfy the condition of Formula (1) above, and also the melting point of the carboxylic acid anhydride and the melting point of the polyamide resin satisfy the condition of Formula (2) below.

$$\text{Melting point of carboxylic acid anhydride} \leq \text{melting point of polyamide resin} + 50° \text{ C.} \quad (2)$$

The melting point of the polyamide resin and the melting point of the carboxylic acid anhydride satisfy the condition of Formula (2), thereby making it possible to melt-knead the degradable resin composition at a temperature where the carboxylic acid anhydride can be molten so as not to excessively heat the polyamide resin. Therefore, a degradable resin composition in which the carboxylic acid anhydride is dispersed uniformly in the polyamide resin can be obtained. That is, the degradable resin composition for forming the downhole tool according to an aspect is obtained by kneading the carboxylic acid anhydride and the polyamide resin both in a molten state at a temperature higher than the melting point of the carboxylic acid anhydride and the melting point of the polyamide resin.

(Polyamide Resin)

The polyamide resin is a ring-opening (co)polymer of a caprolactam, or a copolycondensate of a polycarboxylic acid and a diamine. Note that the polyamide resin may be a combination of two or more types of polyamide resins that are different in structure from each other. Also note that the "ring-opening (co)polymer" collectively means ring-opening polymers and ring-opening copolymers.

The polyamide resin may be a ring-opening polymer of one type of caprolactam or a ring-opening copolymer of two or more types of caprolactams. Examples of the caprolactam used in the ring-opening polymer or ring-opening copolymer include caprolactams having 6 to 20 carbon atoms, such as ε-caprolactam, undecane caprolactam, and lauryl caprolactam.

The polyamide resin can also be a copolycondensate of a polycarboxylic acid and a diamine.

Polycarboxylic acids used in the copolycondensate are roughly classified into aromatic polycarboxylic acids and aliphatic polycarboxylic acids. The aromatic polycarboxylic acid is, for example, an aromatic polycarboxylic acid having an aromatic structure such as a benzene backbone and a naphthalene backbone. More specific examples thereof include aromatic dicarboxylic acids such as isophthalic acid, orthophthalic acid, terephthalic acid, and 2,6-naphthalene dicarboxylic acid; aromatic tricarboxylic acids such as 1,2,4-trimellitic acid; aromatic tetracarboxylic acids such as 1,2,4,5-benzene tetracarboxylic acid, 3,3',4,4'-biphenyl tetracarboxylic acid, and pyromellitic acid; and anhydrides of these aromatic polycarboxylic acids. Two or more types of aromatic polycarboxylic acids and anhydrides thereof may be used in combination. Furthermore, the aliphatic polycarboxylic acid is an aliphatic polycarboxylic acid having a linear, branched, or cyclic hydrocarbon structure with 4 to 18 carbon atoms. More specific examples thereof include aliphatic dicarboxylic acids such as adipic acid and sebacic acid; aliphatic tricarboxylic acids such as cyclohexane tricarboxylic acid; aliphatic tetracarboxylic acids such as 1,2,3,4-butane tetracarboxylic acid and cyclobutane tetracarboxylic acid; and anhydrides of these aliphatic polycarboxylic acids. Two or more types of aliphatic polycarboxylic acids and anhydrides thereof may be used in combination.

Diamines used in the copolycondensate are roughly classified into aromatic diamines and aliphatic diamines. The aromatic diamine is an aromatic diamine having an aromatic structure such as a benzene backbone and a naphthalene backbone. More specific examples thereof include diaminobenzene, xylylene diamine, 4,4'-diaminobiphenyl, and 4,4'-diaminodiphenyl ether. Furthermore, the aliphatic diamine is an aliphatic diamine having a linear, branched, or cyclic hydrocarbon structure with 4 to 20 carbon atoms. More specific examples thereof include aliphatic diamines such as methylpentadiamine, hexamethylenediamine, cyclohexanediamine, and nonanediamine.

From the perspective of suitably maintaining the compressive strength of the downhole tool in a higher temperature environment, the melting point of the polyamide resin is 150° C. or higher, more preferably 160° C. or higher, most preferably 170° C. or higher. Furthermore, the melting point of the polyamide resin is not particularly limited, but is 350° C. or lower, more preferably 330° C. or lower, most preferably 320° C. or lower from the perspective of the carboxylic acid anhydride being able to be suitably melt-kneaded into the polyamide resin.

Examples of such a polyamide resin include nylon 6 (melting point: 225° C.), nylon 11 (melting point: 187° C.), nylon 12 (melting point: 176° C.), nylon 66 (melting point: 265° C.), nylon 6T (melting point: 290° C.), nylon 9T (melting point: 306° C.), and MXD6 nylon (melting point: 237° C.). Note that the melting point of the polyamide resin described in the present specification should be referred to as a representative value. More specifically, the melting point of the polyamide resin is a melting point as determined by differential scanning calorimetry (DSC). More specifically, the melting point of the polyamide resin can be determined from a DSC curve obtained by differential scanning calorimetry (DSC) under conditions: under nitrogen atmosphere and at a temperature increase rate of 10° C./min and a temperature ranging from 50° C. to 400° C.

Furthermore, from the perspective of increasing the initial compressive strength of the degradable resin composition, the polyamide resin is preferably a semi-aromatic polyamide having an aromatic structure derived from an aromatic polycarboxylic acid or an aromatic diamine, or a polyamide-imide having an imide bond derived from an aromatic tricarboxylic acid, an aromatic tetracarboxylic acid, an aliphatic tricarboxylic acid, or an aliphatic tetracarboxylic acid. Examples of the semi-aromatic polyamide include nylon 6T, nylon 9T and MXD6 nylon described above. Note that, from the perspective of having low solubility in water in a high-temperature environment, a polyamide resin having an aromatic structure is preferred.

Examples of the semi-aromatic polyamide include VESTAMID (trade name) (available from Daicel-Evonik Ltd.) and ARLEN (trade name) (available from Mitsui Chemicals, Inc.). In addition, the polyamide-imide is, for example, commercially available Torlon (trade name) (available from Solvay S.A.).

Furthermore, from the perspective of suitably maintaining the compressive strength until a predetermined time in a high-temperature environment, the polyamide resin that serves as the main resin component of the degradable resin composition is preferably a ring-opening polymer or ring-opening copolymer of a caprolactam, or a copolycondensate of a polycarboxylic acid and a diamine. In other words, from the perspective of imparting elasticity to the downhole tool, the polyamide resin may be a thermoplastic elastomer of a polyamide resin containing a polyamide which is a ring-opening (co)polymer or copolycondensate as a hard segment, and a polyether, a polyester or the like as a soft segment. From the perspective of more suitably maintaining the compressive strength in a high-temperature environment, the polyamide resin is preferably not a thermoplastic elastomer of a polyamide resin.

(Carboxylic Acid Anhydride)

The degradable resin composition contains a carboxylic acid anhydride as a degradation accelerator. Examples of the carboxylic acid anhydride include monocarboxylic acid anhydrides such as benzoic acid anhydride (melting point: 42° C., boiling point: 360° C.); dicarboxylic acid anhydrides such as diglycolic acid anhydride (melting point: 91 to 93° C., boiling point: 240 to 241° C.) and isophthalic acid anhydride (melting point: 131 to 134° C., boiling point: 284° C.); tricarboxylic acid anhydrides such as trimellitic acid anhydride (melting point: 163 to 166° C., boiling point 390° C.); and tetracarboxylic acid dianhydrides such as 1,2,4,5-benzene tetracarboxylic acid dianhydride (melting point: 286° C., boiling point 397 to 400° C.), 3,3',4,4'-biphenyl tetracarboxylic acid dianhydride (melting point: 299° C., boiling point 315° C./400 Pa, 5% weight reduction temperature: 325° C.), 3,3',4,4'-benzophenone tetracarboxylic acid dianhydride (melting point: 218 to 222° C., boiling point: 320° C., 5% weight reduction temperature: 304° C.), 1,2,3, 4-butane tetracarboxylic acid dianhydride (melting point: 260° C.), and cyclobutane tetracarboxylic acid dianhydride (melting point: 285° C., boiling point: 398° C.). The affinity between the carboxylic acid anhydride and the polyamide resin can be increased by using, as a degradation accelerator, a carboxylic acid anhydride which may be introduced into a part of the structure of the polyamide resin, in this way. Therefore, a degradable resin composition in which the carboxylic acid anhydride is uniformly dispersed can be obtained.

Note that, in the relationship with the melting point of the polyamide resin to be melt-kneaded, it is preferable to select a carboxylic acid anhydride satisfying Formula (1) above, and more preferable to select a carboxylic acid anhydride having a melting point satisfying Formula (2) above, as explained above.

The content of the carboxylic acid anhydride in the degradable resin composition is preferably within a range of 0.1 mass % or greater and 10 mass % or less, more preferably within a range of 0.1 mass % or greater and 7 mass % or less, most preferably within a range of 0.2 mass % or greater and 5 mass % or less, relative to the content of the polyamide resin. If the content of the carboxylic acid anhydride is 0.1 mass % or greater, it is possible to maintain the compressive strength of the downhole tool for a predetermined period of time from the beginning of the use of the downhole tool molded from the degradable resin composition in a high-temperature environment, and thereafter to rapidly degrade the downhole tool. In addition, if the content of the carboxylic acid anhydride is 10 mass % or less, it is possible to prevent a decrease in initial strength of the downhole tool and a rapid decrease in strength thereof in a high-temperature environment.

(Reinforcing Material)

The degradable resin composition forming the downhole tool according to an aspect of the present invention more preferably contains a reinforcing material.

Since a predetermined proportion of the reinforcing material is contained in the degradable resin composition, the compressive strength of the downhole tool can be increased. Further, the downhole tool can attain high impact resistance so that it is not easily damaged even by contact or collision with various members used for well drilling.

The content of the reinforcing material in the degradable resin composition for forming the downhole tool can appropriately be determined according to the compressive strength required of the downhole tool. When the total amount of the polyamide resin, carboxylic acid anhydride, and reinforcing material is 100 mass %, the content of the reinforcing material is 5 mass % or greater and 50 mass % or less, and is preferably 10 mass % or greater and 50 mass % or less, more preferably 15 mass % or greater and 50 mass % or less.

Examples of the reinforcing material include fiber reinforcing materials such as inorganic fiber reinforcing materials and organic fiber reinforcing materials, and particulate reinforcing materials.

Examples of the inorganic fiber reinforcing material include inorganic fibers such as glass fibers (GF), carbon fibers, asbestos fibers, silica fibers, alumina fibers, zirconia fibers, boron nitride fibers, silicon nitride fibers, boron fibers, and potassium titanate fibers; and alloy fibers or metal fibers of stainless steel, aluminum, titanium, steel, brass and the like. The inorganic fiber reinforcing material is a short fiber having a length of typically 10 mm or less, preferably from 1 to 6 mm, more preferably from 1.5 to 4 mm, and is particularly preferably a glass fiber.

Examples of the organic fiber reinforcing material include high-melting-point organic fibers formed of polyamide resins, polyester resins, acrylic resins, fluorine resins, and the like. From the perspective of mechanical strength, impact resistance and degradability of the degradable resin composition that forms the downhole tool or member thereof, preferable examples of the organic fiber reinforcing material include organic fiber reinforcing materials that belong to so-called high performance/high-functioning fibers or super fibers having high strength, wear resistance, heat resistance, and the like. More specifically, there are indicated aramid fibers (wholly aromatic polyamide fibers) such as Kevlar (trade name), TOWARON (trade name), Technora (trade name), and Nomex (trade name); polyparaphenylene benzobisoxazole fibers such as Zylon (trade name); polyarylate fibers (polyesters) such as Vectran (trade name); tetrafluoroethylene fibers such as Toyoflon (trade name) and Teflon (trade name); and ultra-high molecular weight polyethylene fibers such as Dyneema (trade name). Particularly preferably, the organic fiber reinforcing material is an aramid fiber or polyparaphenylene benzobisoxazole fiber.

The fiber diameter of the organic fiber reinforcing material is preferably from 0.5 to 100 µm, more preferably from 1 to 80 µm, further preferably from 3 to 50 µm. In addition, the organic fiber reinforcing material has a fiber length of preferably 10 mm or less, more preferably from 0.5 to 9 mm, further preferably from 1 to 8 mm. If the fiber diameter or fiber length is too small, the mechanical strength required of the downhole tool may not be obtained. If the fiber diameter or fiber length is too large, the degradability may be impaired, or the moldability may be deteriorated.

Further, as the particulate reinforcing material, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used. The particle size of the particulate reinforcing material is typically from 0.01 μm to 1000 μm, preferably from 0.05 to 500 μm, more preferably from 0.1 to 200 μm.

The reinforcing material may be treated with a sizing agent or surface treatment agent as necessary. Examples of the sizing agent or surface treatment agent include functional compounds such as epoxy-based compounds, isocyanate-based compounds, silane-based compounds, and titanate-based compounds. These compounds may be used to perform surface treatment or sizing treatment on the reinforcing material in advance or may be added at the time of the preparation of the degradable resin composition for the downhole tool or member thereof.

The inorganic fiber reinforcing materials, organic fiber reinforcing materials and particulate reinforcing materials can each be used alone, or two or more types thereof can be used in combination.

(Other Blended Components)

In the downhole tool according to an aspect of the present invention, other reinforcing materials, various additives of a stabilizer, other resin materials, and the like may be contained, as other blended components, in the degradable resin composition forming the downhole tool as long as the object of the present invention is not inhibited.

Examples of other various additives that can be contained in the degradable resin composition for forming the downhole tool according to an aspect of the present invention include elastic materials such as various types of rubber materials or elastomer materials. Specific examples thereof include thermoplastic elastomers such as acrylic rubber-containing methacrylate resins having a core-shell structure, and degradable rubber materials or elastomeric materials. More specific examples thereof include aliphatic polyester rubbers, polyurethane rubbers, natural rubbers, isoprene rubbers, and rubber materials or elastomer materials having a hydrolyzable functional group. Such other various additives are contained in the degradable resin composition, whereby the toughness of the degradable resin composition may be improved, and the impact resistance may further be improved. Fiber-shaped or particle-shaped substances can be contained as the other blended components, and one or more types thereof can be contained. The content of the other blended components can appropriately be determined. When the total amount of the degradable resin composition (that is, the polyamide resin and the carboxylic acid anhydride, and the reinforcing material to be blended as necessary) is 100 parts by mass, the content of the other blended components is typically 10 parts by mass or less, preferably 5 parts by mass or less, more preferably 3 parts by mass or less.

[Compressive Strength]

The degradable resin composition for molding the downhole tool according to an aspect of the present invention preferably has an initial compressive strength at 140° C. of 60 MPa or greater. The compressive strength can be measured, as uniaxial compressive strength, in accordance with JIS K7178. See Examples, for the details such as the size of a test piece.

If the compressive strength at 140° C. after 24 hours from the initial stage is 60 MPa or greater, the downhole tool enables operations while maintaining sufficient strength for at least one day in a well that is in a high-temperature environment of 140° C. In addition, if the compressive strength at 140° C. after 120 hours is 60 MPa or less, it can be rapidly hydrolyzed in a well that is in a high-temperature environment of 140° C.

<Plug>

A plug which is an exemplary downhole tool composed of a plurality of downhole tool members, as illustrated in FIG. 1, will be described as an aspect of the downhole tool according to the present invention. A typical structure of a plug (frac plug, bridge plug, or the like), which is a downhole tool, includes a mandrel 1, which is a downhole tool member extending in a direction that extends along the downhole (in many cases a hollow tubular body, but not limited thereto; approximate typical outer diameter from 30 to 200 mm, length from 250 to 2000 mm), and an annular rubber member 2, slips 3a and 3b, wedges 4a and 4b, and a pair of rings 5a and 5b and the like, which are downhole tool members placed circumferentially with separation in the axial direction of the mandrel 1 on the outer circumferential surface of the mandrel 1. The plug illustrated in the schematic section view of FIG. 1 also includes a ball sealer (ball) 10 and a substantially round annular ball seat 11 having a circular opening with a smaller diameter than the ball sealer 10 in the center part thereof, both of which are downhole tools, in the hollow part h of the mandrel 1.

Furthermore, each ball sealer 10 and ball seat 11 provided in the hollow part h of the mandrel 1 can move along the axial direction of the mandrel 1 inside the hollow part h of the mandrel 1. The flow direction of a fluid can be adjusted by the ball sealer 10 coming into contact with or moving away from the circular opening of the ball seat 11. The annular rubber member 2 expands in diameter in a direction orthogonal to the axial direction of the mandrel 1 as it is compressed and decreases in diameter in the axial direction of the mandrel 1, such that the outside comes into contact with the inside wall H of the downhole and the inside comes into contact with the outer circumferential surface of the mandrel 1, thereby plugging (sealing) the space between the plug and the downhole.

The downhole tool according to an aspect of the present invention includes, for example, a downhole tool member molded from the degradable resin composition, for at least a part of downhole tool members constituting the plug as described above. Here, the volume ratio of at least one downhole tool member molded from the degradable resin composition to the downhole tool is more preferably 50% or greater of the entire downhole tool. More specifically, it is preferable that downhole tool members other than the annular rubber member 2, i.e., the mandrel 1, slips 3a and 3b, wedges 4a and 4b, rings 5a and 5b, ball sealer 10, and ball seat 11, in the plug illustrated in FIG. 1, be molded from the degradable resin composition. Thus, it is possible to impart degradability in a predetermined environment to substantially all the downhole tool members, and to provide a downhole tool with excellent strength.

<Methods for Manufacturing Degradable Resin Composition and Downhole Tool>

A manufacturing apparatus is not limited as long as it is possible to melt-knead the polyamide resin and the carboxylic acid anhydride, and the reinforcing material to be blended as necessary in a method for manufacturing the degradable resin composition for molding the downhole tool.

In the method for manufacturing the degradable resin composition, a polyamide resin and a carboxylic acid anhydride for use in the degradable resin composition are selected so as to satisfy the condition of Formula (1) below, and are melt-kneaded at a temperature higher than the temperature corresponding to the melting point of the selected polyamide resin.

$$\text{Melting point of polyamide resin} \leq 5\% \text{ weight reduction temperature of carboxylic acid anhydride} \tag{1}$$

As a result, it is possible to prevent vaporization of the carboxylic acid anhydride and generation of bubbles when melt-kneading the degradable resin composition.

Furthermore, in the method for manufacturing the degradable resin composition, it is more preferable to select the polyamide resin and the carboxylic acid anhydride so that the melting point of the polyamide resin and the 5% weight reduction temperature of the carboxylic acid anhydride satisfy the condition of Formula (1) above, and that the melting point of the carboxylic acid anhydride and the melting point of the polyamide resin satisfy the condition of Formula (2) below, and to melt-knead the melting point of the polyamide resin and the carboxylic acid anhydride at a temperature corresponding to a melting point higher than the melting point of the carboxylic acid anhydride.

$$\text{Melting point of carboxylic acid anhydride} \leq \text{melting point of polyamide resin} + 50° \text{ C.} \quad (2)$$

As a result, it is possible to melt-knead the degradable resin composition so as to melt the carboxylic acid anhydride while preventing vaporization of the carboxylic acid anhydride and generation of bubbles when melt-kneading the degradable resin composition. Therefore, a degradable resin composition in which the carboxylic acid anhydride is dispersed uniformly in the polyamide resin can be obtained.

After melt-kneading, the degradable resin composition may be pelletized in advance, and the pelletized degradable resin composition may be melt-kneaded to mold the downhole tool. When the downhole tool is molded from the pellets, the temperature conditions at the time of melting the pellets may be determined, according to the temperature conditions at the time of melt-kneading the polyamide resin and the carboxylic acid anhydride, with reference to Formulas (1) and (2) above.

Examples of the method for molding the downhole tool include cast molding, compression molding, injection molding, extrusion molding, solidification- and extrusion-molding, centrifugal molding, and other known molding methods. The downhole tool is preferably formed from the degradable resin composition or pellets thereof by these molding methods.

Furthermore, a ball-shaped downhole tool or a member thereof, and a downhole tool or a member thereof that is a rod-like body, hollow body or plate-like body having a heteromorphic cross section (for example, a rod-like body and a hollow body having portions with different outer diameters and/or inner diameters in the lengthwise direction) may be manufactured by forming a preform for manufacturing the downhole tool and subjecting the preform to machining such as cutting and perforation, as necessary. Furthermore, the molded products obtained by these manufacturing methods may be combined by a per se known method to manufacture the downhole tool or member thereof.

SUMMARY

As is clear from the above description, the downhole tool according to an aspect of the present invention is formed from a degradable resin composition containing a polyamide resin and a carboxylic acid anhydride, and the carboxylic acid anhydride is a compound satisfying the following melting point condition:

melting point of polyamide resin≤5% weight reduction temperature of carboxylic acid anhydride.

In the downhole tool according to an aspect of the present invention, the content of the carboxylic acid anhydride in the degradable resin composition is more preferably 0.1 mass % or greater and 10 mass % or less of the polyamide resin.

In the downhole tool according to an aspect of the present invention, the carboxylic acid anhydride is more preferably at least one selected from the group consisting of 3,3',4,4'-biphenyl tetracarboxylic acid dianhydride; 1,2,4,5-benzene tetracarboxylic acid dianhydride; 3,3',4,4'-benzophenone tetracarboxylic acid dianhydride; 1,2,3,4-butane tetracarboxylic acid dianhydride; and cyclobutane tetracarboxylic acid dianhydride.

Also, in the downhole tool according to an aspect of the present invention, more preferably, the degradable resin composition further contains a reinforcing material.

Additionally, in the downhole tool according to an aspect of the present invention, the polyamide resin is more preferably a polyamide-imide, a semi-aromatic polyamide, or a combination thereof.

The downhole tool according to an aspect of the present invention is more preferably composed of a plurality of downhole tool members, and the volume ratio of at least one of the plurality of downhole tool members, which is formed from the degradable resin composition, to the downhole tool is 50% or greater of the entire downhole tool.

In addition, the downhole tool according to an aspect of the present invention is more preferably a plug.

The present invention is not limited to the above-described embodiments, and various modifications can be made within the scope of the claims, and embodiments obtained by appropriately combining technical means disclosed in different embodiments are also included in the technical scope of the present invention.

EXAMPLES

An embodiment of the present invention will be described below.

<Analysis Method>
(Evaluation of Compressive Strength)

The compressive strength was evaluated in accordance with JIS K7178. A test piece having a cross section of 5 mm×5 mm and a thickness of 3 mm was compressed at a rate of 10 mm/min in an oven at 140° C. to obtain a compressive strain-compressive stress curve. An inflection point of the compressive strain-compressive stress curve obtained was taken as uniaxial compressive strength. When the test piece broke prior to inflection, the stress at break was taken as the uniaxial compressive strength.

(Five (5)% Weight Reduction Temperature)

A sample (10 mg) of a carboxylic acid anhydride placed in an alumina pan was set in a thermogravimetric analysis device (TGA2 available from Mettler Toledo). The temperature was increased from 50° C. to 400° C. at a temperature increase rate of 10° C./min under nitrogen atmosphere at a flow rate of 40 ml/min, and the weight change of the sample was measured. From the results obtained, the temperature at which the weight of the sample was reduced by 5% was defined as 5% weight reduction temperature.

Example 1

To 100 parts by weight of dried VESTAMID HT plus R1035 black available from Daicel-Evonik Ltd. (6T nylon containing 50% of GF) (melting point: 310° C.), 2 parts by weight of 3,3',4,4'-biphenyl tetracarboxylic acid dianhydride (melting point: 299° C., 5% weight reduction temperature: 325° C.) was added, and they were mixed at room temperature to obtain a mixture. The mixture obtained was continuously fed into a twin screw extruder 2D25S available from Toyo Seiki Co., Ltd. (cylinder temperatures set to 290° C./320° C./320° C./320° C. in the order of C1/C2/C3/die, screw rotation speed: 50 rpm) and melt-kneaded, and strands of the 6T nylon composition continuously discharged from the die were cooled with dry air and pelletized with a pelletizer.

The obtained pellets of the 6T nylon composition were subjected to an injection molding machine IS-75E available from Toshiba Machine Co., Ltd. (cylinder temperatures set to 290° C./320° C./320° C./320° C./320° C. in the order of C1/C2/C3/C4/head, mold temperature: 130° C., screw rotation speed: 50 rpm, injection speed: 20 mm/sec, injection pressure: 20 MPa) to obtain injection-molded pieces with a good appearance, which were each in a rectangular parallelepiped shape of 5 mm×5 mm×3 mm Note that, since the melting point of the polyamide resin before and after compounding of the carboxylic acid anhydride was unchanged, the temperature of the injection molding machine was set to be the same as the temperature during melt-kneading. The injection-molded pieces obtained were soaked in hot water heated to 140° C. in an autoclave for 24 hours and 120 hours, and thereafter removed and dried for 2 hours under dry air atmosphere at 120° C., and the compressive strength was then measured. The compressive strength of the initial injection-molded pieces that were not soaked in hot water was also measured. The compressive strength of the injection-molded piece when soaked in hot water at 140° C. for 168 hours (7 days) was 35 MPa, and a number of cracks were observed on the surface of the injection-molded piece.

Comparative Example 1

Injection-molded pieces with a good appearance were obtained in the same manner as in Example 1 except that no 3,3',4,4'-biphenyl tetracarboxylic acid dianhydride was added. The injection-molded pieces obtained were soaked in hot water at 140° C. in an autoclave for 24 hours and 120 hours, and thereafter removed and dried for 2 hours under dry air atmosphere at 120° C., and the compressive strength was then measured. The compressive strength of the initial injection-molded pieces that were not soaked in hot water was also measured. The compressive strength of the injection-molded piece of Comparative Example 1 when soaked in hot water at 140° C. for 456 hours (19 days) was 62 MPa. No surface crack was observed as observed when the injection-molded piece of Example 1 was soaked in hot water at 140° C. for 168 hours (7 days).

Comparative Example 2

Injection-molded pieces were obtained in the same manner as in Example 1 except that 5 parts by weight of 3,3',4,4'-benzophenone tetracarboxylic acid dianhydride (melting point: 218 to 222° C., 5% weight reduction temperature: 304° C.) was added and mixed at room temperature instead of 3,3',4,4'-biphenyl tetracarboxylic acid dianhydride. Bubbles and surface fractures were observed in the obtained molded pieces. The injection-molded pieces obtained were soaked in hot water at 140° C. in an autoclave for 24 hours and 120 hours, and thereafter removed and dried for 2 hours under dry air atmosphere at 120° C., and the compressive strength was then measured. The compressive strength of the initial injection-molded pieces that were not soaked in hot water was also measured.

The evaluation results of the Examples and Comparative Examples are shown in Table 1 below.

Reference Example

Injection-molded pieces were obtained in the same manner as in Example 1, except that PGA (available from Kureha Corporation, polyglycolic acid, melt viscosity: 900 Paas) was used instead of the mixture of Example 1, and that the cylinder temperatures were set to 230 to 250° C. The compressive strength at 140° C. of the injection-molded pieces obtained was 54 MPa at the initial stage.

TABLE 1

|  | Injection piece appearance | Compressive strength (140° C., MPa) | | |
| --- | --- | --- | --- | --- |
|  |  | Initial stage | After 24 hours | After 120 hours |
| Example 1 | Good | 67 | 64 | 39 |
| Comparative Example 1 | Good | 84 | 69 | 64 |
| Comparative Example 2 | Bubbles present | 53 |  |  |

INDUSTRIAL APPLICABILITY

The present invention can be applied to downhole tools which surely perform well treatment under harsh and diverse excavation conditions and diverse well environmental conditions and, thereafter, are degraded, and thus can contribute to reduction in expense of well drilling and shortening of the process thereof.

REFERENCE SIGNS LIST

1 Mandrel
2 Annular rubber member
3a, 3b Slip
4a, 4b Wedge
5a, 5b (Pair of) ring
10 Ball sealer (ball)
11 Ball seat
H Inside wall of downhole
h Hollow part of mandrel

The invention claimed is:

1. A downhole tool formed from a degradable resin composition comprising a polyamide resin and a carboxylic acid anhydride,
wherein the carboxylic acid anhydride is a compound satisfying the following condition:

melting point of polyamide resin≤5% weight reduction temperature of carboxylic acid anhydride.

2. The downhole tool according to claim 1, wherein a content of the carboxylic acid anhydride in the degradable resin composition is 0.1 mass % or greater and 10 mass % or less of the polyamide resin.

3. The downhole tool according to claim 1, wherein the carboxylic acid anhydride is at least one selected from the group consisting of 3,3',4,4'-biphenyl tetracarboxylic acid dianhydride; 1,2,4,5-benzene tetracarboxylic acid dianhydride; 3,3',4,4'-benzophenone tetracarboxylic acid dianhydride; 1,2,3,4-butane tetracarboxylic acid dianhydride; and cyclobutane tetracarboxylic acid dianhydride.

4. The downhole tool according to claim 1, wherein the degradable resin composition further comprises a reinforcing material.

5. The downhole tool according to claim 1, wherein the polyamide resin is a polyamide-imide, a semi-aromatic polyamide, or a combination thereof.

6. The downhole tool according to claim 1,
wherein the downhole tool is composed of a plurality of downhole tool members; and
a volume ratio of at least one of the plurality of downhole tool members, which is formed from the degradable resin composition, to the downhole tool is 50% or greater of the entire downhole tool.

7. The downhole tool according to claim 6, which is a plug.

* * * * *